United States Patent [19]
Virtanen

[11] Patent Number: 4,968,349
[45] Date of Patent: Nov. 6, 1990

[54] METHOD FOR PRODUCING HARDENED CEMENT MINERAL MATERIAL, ESPECIALLY CONCRETE, AND AN APPARATUS FOR IMPLEMENTATION OF THE METHOD

[75] Inventor: Pentti Virtanen, Toijala, Finland
[73] Assignee: Kautar Oy, Toijala, Finland
[21] Appl. No.: 246,542
[22] PCT Filed: Mar. 17, 1987
[86] PCT No.: PCT/FI87/00038
 § 371 Date: Sep. 16, 1988
 § 102(e) Date: Sep. 16, 1988
[87] PCT Pub. No.: WO87/05596
 PCT Pub. Date: Sep. 24, 1987
[30] Foreign Application Priority Data
 Mar. 17, 1986 [FI] Finland ............................... 861110
[51] Int. Cl.⁵ ........................................... C04B 28/02
[52] U.S. Cl. ................................. 106/707; 106/708; 106/709; 106/726; 106/731; 106/729; 106/790; 366/169
[58] Field of Search ................. 106/90, 97; 366/169
[56] References Cited
 U.S. PATENT DOCUMENTS 2,592,709 4/1952 Kinnaird .......................... 366/169
 2,783,157 2/1957 Grant et al. ...................... 106/92
 3,619,221 11/1971 Kossivas ........................... 106/90
 4,676,832 6/1987 Childs et al. ..................... 106/90

FOREIGN PATENT DOCUMENTS
 2121244 11/1972 Fed. Rep. of Germany .

*Primary Examiner*—Olik Chaudhuri
*Assistant Examiner*—Andrew Griffis
*Attorney, Agent, or Firm*—Birch, Stewart, Kolasch & Birch

[57] ABSTRACT

The invention concerns a method for producing a hardened mineral product, especially concrete. The method utilizes a hydration reaction with water for at least 1 hour, preferably for 4 to 40 hours, by producing a water/binding agent paste containing components for retardation of binding agent crystallization together with other possible admixtures, e.g., accelerators. When the binding agent reaches an appropriate degree of hydration, preferably 10 to 90%, the unset paste is complemented with fillers for producing the desired mineral mix, after which the end product is shaped as desired and hardened. The water/binding agent paste is agitaged in order to promote the hydration reaction, and when required, admixed with an additional amount of the retarding component of the binding agent crystallization. Furthermore, the invention includes an apparatus for hydrating the binding agent with a facility for subjecting the paste to compacting pressurization in order to improve hydration.

24 Claims, 2 Drawing Sheets

METHOD FOR PRODUCING HARDENED CEMENT MINERAL MATERIAL, ESPECIALLY CONCRETE, AND AN APPARATUS FOR IMPLEMENTATION OF THE METHOD

BACKGROUND OF THE INVENTION

1. Field of the Invention

The present invention relates to a method for producing hardened cement mineral material, especially concrete.

In accordance with the proposed method of the present invention, a hydraulically setting binding agent is used, such as portland cement or iron furnace or blast furnace slag, and the binding agent is mixed with water, and when desired, filler material, in order to produce a hardened material.

The invention also concerns an apparatus for hydrating a rapid hardening binding agent used in the production of a cement mineral material, especially concrete or mortar.

2. Description of Related Art

As known in the art, building technology today is based mainly on the use of a material called concrete, while different kinds of mortars and trowelling materials based on the same types of binding agents are in use. Concrete, as well as the abovementioned mortars and trowelling materials, are materials in which stone aggregates and/or sand are bonded together with a binding agent. The reinforcement of these materials is usually based on the use of steel rods or cables.

The aforementioned binding agent is most generally produced by a firing method at a high temperature, where compounds capable of re-reacting with water and recrystallizing into a new compound containing water are formed. The concrete mix or the aforementioned mortar can then be produced by mixing the binding agent and the filler material to be bonded using water, casting, and allowing to set. A defined period of time is required for the hydration and recrystallization process.

Concrete mixes produced of currently available construction cements typically achieve their normal strength in about 28 days.

It has become customary to fabricate structural elements from the aforementioned concrete and steels because the characteristics of said concrete, such as its high pH level resulting from the lime released in the hydration process, protect steel-reinforced parts from corrosion over an extended period of time. During the setting of a typical modern concrete, a relatively high amount of heat is developed in the hydration process and the subsequent crystallization process. Thus, the major portion of heat developed is released during the aforementioned hydration process, and a minor portion released later, during the crystallization process. The strength of the concrete matrix is only developed during the subsequent crystallization process when the crystalline needles grow, initiating from the different particles, progressively approaching each other and finally coalescing.

The production method of concrete in the art is recognized as incorporating the following disdvantages of a fundamental nature:

slow setting, resulting from the necessity of required hydration preceding the crystallization process, formation of so-called microcracks caused by high internal heat development, problems caused by high pH, resulting in a relatively small selection of applicable reinforcement materials, only such reinforcement materials which are tolerant to a high pH or require a high pH, can be used, so called macro-compactivity is relatively poor in a concrete mix, in which the fine-ground cement, stone and sand aggregates are mixed together with water because water will be used in excess and no "padding" components are present, and microporosity is created by microcracks which are mainly caused by internal stresses.

Furthermore, today's cement requires strictly defined raw materials. Typical examples of practical limitations associated with the use of limes containing magnesium, are the formation of periclase phase, as well as the swelling and cracking of concrete at a later stage.

As is commonly known in the art, the binding agent particles are hydrated by the effect of water during the preparation of mixes consisting of a binding agent, water, and stone aggregates. Starting from the surface of binding agent particles, the hydration process proceeds by gel formation and therefrom towards elementary crystals, which grow by lengthening and coalescence with the gels of other binding agent particles. Thus, a network of crystals is formed which binds the material. Through this process the material is stiffened, strengthened, and developed to final strength as the crystals grow in size.

In conventional cement and concrete technology, hydration leads to the formation of calcium silicate gel and its subsequent crystallization both of which processes proceed almost simultaneously and immediately follow each other. Today, the conventionally used portland cement is normally ground to a mesh of 325 to 450 $m^2/kg$, with the average size of particles being about 25 micrometers. Continued grinding into a finer mesh does not lead to a greater strength of the concrete produced by normal methods from portland cement, and, disregarding the initial stiffening, neither does the development of strength significantly improve. This is caused by the fact that hydration reaches a major portion of the surfaces and even of the cores of cement particles at the aforementioned fineness of mesh of particles. On the other hand, for instance, when the binding agent is produced from ground slag, pozzolanic materials, etc., an essentially finer mesh is required in order to achieve a rapid development of strength because the depth development of gelling is smaller and, consequently, the gelling time is longer.

Modern concrete technology recognizes a great number of admixturing and complementing mixing constituents, which are used in cement and concrete when producing the most suitable concrete mix for particular applications in a particular environment.

Mixing constituents added to cement are fly ash and microsilica, which react in a pozzolanic manner and are readily available from nature in a sufficiently fine mesh allowing their use without grinding. In addition to these, as is generally known, normal portland cement requires about 4 to 8% gypsum as an initial retarder.

Performing as plasticizers, concrete is complemented with organic admixtures, which comprise high molecular weight compounds with an extremely hydrophilic group and an extremely lyophilic group. The lyophilic group attaches the aforementioned molecule of the admixture to the cement particle surface and the hydrophilic group binds water, thus preventing the mutual flocculation of particles. These kinds of molecules operate as spacing constituents between the particles, and thus perform in the capacity of an internal lubricant between the particles. The use of these admixtures reduces the quantity of cement mixing water required, and thereby diminishes the number of pores remaining in the set cement, caused by an excess number of pores resulting from the use of excess water. Examples of these admixtures to be mentioned include high-molecular weight compounds, generally provided with a hydrophilic character by sulfonation, such as the sulfonates of melamine formaldehyde or naphthalene formaldehyde condensate.

In addition to the aforementioned, air entraining admixtures are known in the art, which are typically used for attaining a higher tolerance to frost in concrete surfaces subjected to weathering. The simple effect of the air entraining admixture is to reduce surface tension and to stabilize small air bubbles entrained into the concrete so that the ice formed within the pores is capable of expanding without breaking the structure of concrete.

In addition to the aforementioned gypsum, other augmenting retarders are also known in the art and are often used in massive monolithic casting operations where undue heat development is anticipated or in operations where concreting without the use of retarders may otherwise last longer, or when concrete is required to be transported for long periods of time.

Furthermore, several accelerating admixtures are known, which typically operate by containing anions that increase the solubility of lime in the mixing water, and thereby accelerate the autocatalytic effect of concrete setting caused by the presence of lime.

The aforementioned retarders utilized in this invention raise a high level of interest. They can be used for achieving effects which have not yet been intentionally and in a recognized manner used in concrete technology to a sufficient degree. The investigations performed by Banfill and Sauders (Cement and Concrete Research, 16, 1986, pp. 399 to 410) indicate that retarders have only a slight influence on heat development in hydration. Thus, the measured heat generation in the reference test was 3 mW/g maximally, while in conjunction with a sugar-retarded test it was 2.8 mW/g and with other retarders about 2.8 mW/g. The researchers came to the conclusion that the effect of retarders is not caused by inhibition of hydration via adsorption on the surface of cement particles.

Patent literature offers several examples of proposed solutions based on the use-of retarders. Thus, the WO patent application 82/000138 describes the use of retarders with controlled and repeatable action in mortars, into which up to 30% air is introduced with the admixing of retarders. The inventor has aimed to present "a method for controlled hydration of mortar by retarded initial setting". However, the presented aim seems to be in contradiction with the conclusions expressed by the researchers referred to above.

Equally, the U.S. Pat. publication No. 4,190,454 utilizes a retarder with a controlled retarding action in, for instance, a mix containing citric acid and soda, intended for use in a special cement which is otherwise immediately set after water mixing. Chemicals applicable in retardation and acceleration are also presented in the U.S. Pat. publication No. 3,619,221, which states that plasticizers, such as lignosulfonates, which are otherwise advantageous, almost invariably retard the hardening of concrete. According to the publication, the aforementioned retardation can be compensated by the addition of formic acid and water-soluble amine salts.

The objective of the U.S. Pat. publication No. 3,821,985 concerns admixtures applicable in retardation of cement mixes used in concretion of oil drilling holes. These extremely demanding objects which present a temperature of about 150° C. and pressure exceeding 1000 bar, require a retarder of maximum conceivable efficiency.

SUMMARY OF THE INVENTION

The aim of the present invention is to overcome the disadvantages associated with the prior art technology and to achieve a totally new kind of method for producing concrete, mortars, and other like materials.

The present invention is based on the observation that the crystallization and initial setting of the hydrating cement can be almost completely inhibited by using either chemical retardation as such, or by combining chemical retardation with mechanical treatment, or even by applying mechanical treatment alone. Namely, when effective retarders are used in sufficient quantity in the mixing of the binding agent and water, the hydration of the mixing agent is not affected, but rather only the formation of crystals is retarded. Crystallization can even be entirely inhibited, which at the same time inhibits the hardening of the hydrating cement gel. Equally, the effective mechanical treatment described hereafter is capable of preventing the growth and coalescence of crystals.

Assuming sufficiently fine ground cement is available with a homogeneous mesh composition that has been allowed to hydrate fully and is retarded so that this hydrated gel has not yet started to crystallize, we have a material which can be easily molded, compacted, rolled, extruded, cast or otherwise worked. This kind of cement paste has characteristics closely resembling those of plastic. Although all excess water has been reduced from the mix, it still provides a certain workability owing to its elastic, gel-like physical composition.

A mix of water and hydraulic cement produced in accordance with the invention, in which crystallization has been inhibited chemically and/or mechanically, begins to set faster after the lapse of inhibition and more completely than otherwise would be the case. In prior art conventional techniques it has been customary for any craftsman of the art to allow cast concrete to rest until hardening has proceeded sufficiently far. This invention now suggests a completely opposite approach.

Consequently, this invention utilizes a hydraulically reacting binding agent so that the water reaction and gelling are allowed to take place before casting the concrete or molding to the final shape while the growth or coalescence of crystal nuclei is simultaneously inhibited chemically and/or mechanically.

BRIEF DESCRIPTION OF THE DRAWINGS

FIG. 4 is a schematic cross-sectional view of another embodiment of the apparatus of the present invention wherein the auger flight is smaller in the upper part of the auger mixer than in the lower part thereof.

DETAILED DESCRIPTION

When producing a cement mineral product, the binding agent used, together with required admixtures and the component retarding the binding agent crystallization, is mixed with water so that the crystallization of the binding agent is retarded by the aforementioned component and/or the hereafter described apparatus so as to achieve a degree of hydration of 10% minimum, preferably 15 to 90%. The aforementioned degree of hydration corresponds to the retardation of crystallization from about 60 minutes up to 7 days. Crystallization is preferably retarded by 12 hours, corresponding to a degree of hydration of about 20 to 50%, depending on the temperature applied. The stone aggregate, i.e. gravel and/or sand and/or wood fibers, or like conventionally used material in concrete production, is preferably introduced into the mix after the hydration phase of the binding agent paste. Thereafter the prehydrated, gelled, and filler containing material is molded into desired shape and hardened.

The crystallization retarding component can be admixed into the binding agent before water mixing so that the binding agent and the retarder together with the possible admixtures are first intermixed, after which water is added. The addition of the retarder may also take place so that the binding agent is mixed with water and required admixtures while binding agent crystallization retarding components are introduced into the mix during mixing.

In the context of this application, the term "cement mineral product" refers to all such products, whose production is based on a hardening and crystallizing binding agent, such as portland cement or slag. The products may consist of the hardened binding agent alone together with possible admixtures, or they may preferably contain various fillers, such as aforementioned gravel, sand, and wood fibers.

More specifically, the method in accordance with the invention is a method for producing a hardened stone aggregate product, in particular concrete, which includes using a hydraulically hardening binding agent, at least a portion of which is subjected to a hydration reaction with water for at least about 1 hour, preferably for 4 to 40 hours to produce a water/binding agent paste, which contains one or more components capable of retarding the crystallization of the binding agent together with possible admixtures, and when the binding agent has reached an appropriate degree of hydration, preferably a degree of 10 to 90%, mixing the filler materials, if any, with the paste to form a mixture that is subsequently hardened, characterized by agitating the water/binding agent slurry continuously or in one or several cycles during the hydration reaction, and when the binding agent has reached the appropriate degree of hydration, admixing a fine-ground pozzolanic material in an amount of 1 to 30% by weight of the binding agent in order to decrease the effect of the retarding agent.

Furthermore, the apparatus in accordance with the invention is an apparatus for hydrating a rapidly hardening binding agent to be used in the production of a mineral product, in particular concrete or mortar, which includes an oblong, at least approximately vertically mounted mixing container, means for feeding a water/binding agent paste into an from the container, mixing means fitted within the container at least approximately parallel to its vertical axis, said mixing means having a cylindrical sheath open at its lower end, and a mixing auger fitted within the sheath for agitating the water/binding agent paste that is fed into the container and for lifting it from the lower part of the container to the upper part thereof, and drive means attached to the mixing means for rotating the mixing auger, characterized in that the shaft of the mixing auger is hollow and open-ended, and means are provided for feeding the retarding agent into the container, said means being attached to the upper end of the shaft, whereby the retarder can be admixed via the shaft of the auger into the lower part of the mixing container.

The invention provides outstanding benefits. Accordingly, a profound change in concrete technology is feasible in that the major proportion of the time normally allocated for the setting of concrete will be already expired before the desired element is cast or formed to its final shape, which offers savings in time, costly molds, and expensive manpower. Concurrently, due to reduced heat development, the final stage of production results in less defects in the concrete microstructure, improved corrosion protection of steel parts and improved compaction of concrete. If the size distribution of binding agent particles is homogeneous, e.g. in the order of about 20 $\mu$m, gelling in each particle proceeds to the end simultaneously, and the working of concrete can be performed thereafter. Fast crystallization starts only after the working of the concrete.

The invention is examined in detail with help of the following exemplifying embodiments.

According to the invention, crystallization of the binding agent is preferably retarded by admixturing lignosulfonates, sugars, or sugar acids, just to mention some retarders known in the art. Retarders can be used in an amount of, e.g., 0.01 to 5% by weight. An especially advantageous admixture is lignosulfonate, which is added in an amount of 0.1 to 3% by weight, preferably 0.5 to 2.5% by weight. Sodium gluconate and tartaric acid are also applicable, their amounts being reduced by the ratios of molecular weights in respect to the aforementioned. Retarders can also be introduced into the binding agent in the form of such fillers that by themselves contain retarders such as those mentioned above. Fillers of this category that deserve to be mentioned are primarily materials containing sugars or possibly sugar acids, such as wood, grass, hays, and materials produced from these. The binding agent mix is also preferably complemented with anions that are capable of improving the solubility of lime, customarily referred to as accelerators. As described in the foregoing, the invention aims to retard crystallization while accelerating hydration.

Figure 1:
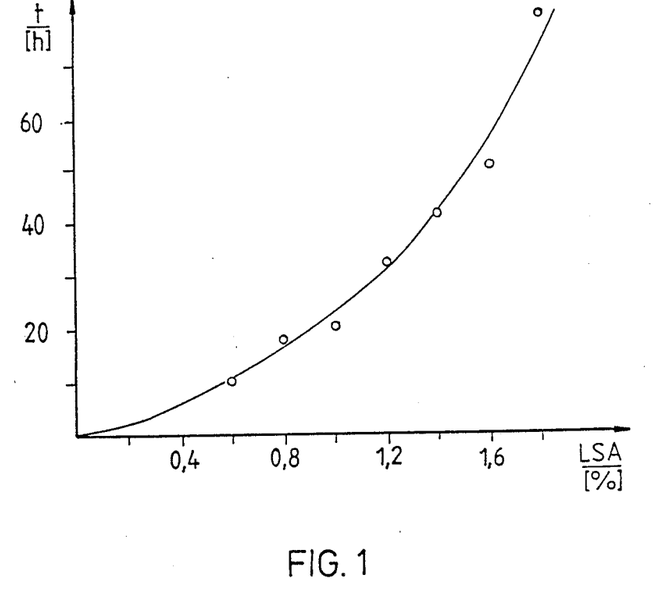
FIG. 1 is a graph showing the relationship between the initial value of cement setting and the amount of added lignosulfonate retarder.

FIG. 1 shows how the initial value of cement setting varies in relation to the applied amount of retarder. In this case, the retarder used is lignosulfonate from fir pulp process, obtained from the mildly alkaline cooking of pulp, with a degree of sulfonation of about 0.14 and having a molecular weight of 5000 on the average, and a purity of 95%.

The cation used is sodium. Lignosulfonate was dosed in one portion. The figure shows, for instance, that the setting of cement starts after about 7 hours if lignosulfonate was added by an amount of 0.55% by weight.

Obviously, a similar graph can be determined for other retarders, too.

Furthermore, it is known in the art that the higher the molecular weight of the retarder used, the more defined and repeatable is its function. This is expressed in, for instance, the WO patent application 82/000138, which states that in order to achieve a repeatable effect of retardation, a retarder molecule containing at least 25 glucose units was required.

The crystallization of the binding agent may also be inhibited by an efficient mechanical treatment, such as agitation. The crystals formed in the cement-water mix are broken due to the agitation thus providing an increased number of crystal surfaces, which further promotes formation of more crystals. Our experiments show that it is possible to hydrate fine-ground cement and to crystallize it into the final shape without allowing the aforementioned crystals to form a homogeneous cement mineral if hydration and crystallization are carried out in such circumstances that the water/cement ratio is sufficiently high and/or sufficiently vigorous agitation is applied. Here, the formed crystalline and binding agent particles are subjected to a continuous movement and agitation, and thus kept sufficiently far apart to prevent the development of a homogeneous crystalline matrix. Instead, separated singular crystals are formed.

The crystallization of the prehydrated material can be achieved by several different methods.

An unexpected observation was that the retardation effect can be stopped within a few minutes by adding microsilca and/or fly ash into the strongly retarded water/binding agent paste (e.g., a paste retarded by 12 h, preferably by 24 h, using conventional retarders) prior to casting the cement mix. The crucial factor herein is the timing of the admixing: the aforementioned admixtures must be added into the binding agent paste only after the hydration process because admixing in the beginning of the process, in conjunction with water mixing, does not render the desired result. Although the mechanism effective in microsilica and fly ash addition is not yet known, a probable factor is the strong reaction of these components with the saturated calcium hydroxide in the mixing water phase, resulting in the formation of calcium silicate hydrates. This is especially true for microsilica. With their large specific surface, the components evidently adsorb the still unbound retarder onto their surface and, due to hydration, bind water. Fly ash contains carbon, which binds organic compounds and is considered a nonpreferred constituent in concrete technology, further promotes the aforementioned adsorption process. Hence, fly ash could be replaced by conventional activated carbon. In addition to the foresaid, it is evident that the pozzolanic reaction begins to form elementary crystals on the surface of a fine-grained material, e.g., such as silica, which advances the formation and coalescence of other crystals. All these four factors combined stop retardation extremely quickly.

An alternative approach is to let the mix undergo an inherent crystallization, e.g. by stopping the mixing. The singular crystals formed during mixing act as crystallization nuclei, which induce a fast crystallization of the mix. Consequently, the alteration and monitoring of the mixing period can be utilized as a means of control, which facilitates the achievement of a final product with desired setting characteristics.

A third alternative is provided by the addition of separately prepared crystallization nuclei. With help of these nuclei, the development of cement mineral can be further accelerated and defined in a desired manner. The crystalline nuclei may consist of either a crystallized binding agent material with a proportion of 10 to 95% of the entire binding agent amount or of the crystals of another material, preferably of a material or mineral containing molecular water. Examples of the aforementioned material that deserve to be mentioned are crystals formed from ettringite. (Ettringite composition: $Ca_6Al_2((OH)_4SO_4)_3 \cdot 26\ H_2O$ or $3\ CaO \cdot Al_2O_3 \cdot 3\ CaSO_4 \cdot 32\ H_2O$, which is formed when $CaSO_4$ in ordinary portland cement containing tricalcium aluminate is bound with the surrounding water.) In order to prevent premature crystallization, the ettringite solution temperature is maintained relatively high (over 60° C.) before dispensing. Crystallization starts only after dispensing the solution when the mix temperature decreases below the aforementioned limit.

The produced cement mineral mix can be hardened by heat curing in a temperature of 20° to 85° C., preferably in 40° to 70° C. The duration of heat treatment is 1 to 28 hours, preferably about 3 to 12 hours. Moreover, the heat treatment by itself promotes the crystallization of the binding agent, and it can be advantageously combined with any method of retardation of binding agent crystallization described in the foregoing.

Figure 2:
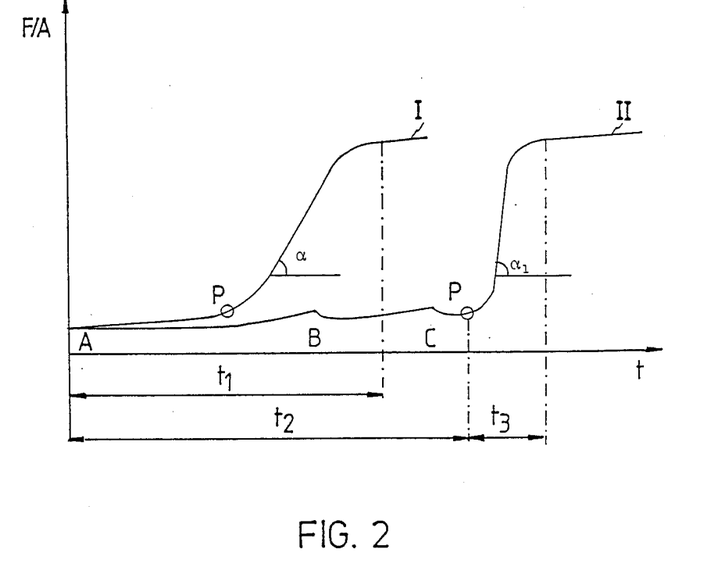
FIG. 2 is a graph showing the hardening properties of conventional cement (I) and cement treated according to the method of the present invention (II) over time.

FIG. 2 shows the hardening graphs for conventional cement and cement hydrated (gelled) according to the invention (graphs I and II, respectively). The diagram clearly indicates the difference between the procedure in accordance with the invention and the prior art technology.

According to the invention, the binding agent required for production of concrete or the like cement mineral material, is mixed with water in toto or in a major portion in a container or reactor in the presence of required admixtures. The mixing can be performed either as a continuous process or in one or several cycles. The cycled mixing consists of mixing periods of, for instance, 10 to 15 minutes at 2 to 4 hour intervals. The purpose of agitating the paste is to prevent separation of solids from the paste, but it also helps in breaking the developed elementary crystals, thus forming crystallization nuclei, which are later advantageously utilized. The admixtures, including the retarders and accelerators, are added to the water/binding agent paste at point A of FIG. 2. The propagation of hydration and end point of retardation in the binding agent is supervised by monitoring the power required for mixing. When the power demand exceeds a preset limit, a predetermined amount of additional retarder is admixed (at points B and C). This amount is partially absorbed on such crystal surfaces that are recently developed or created by breaking in agitation, thus preventing their recrystallization for a certain period of time. Simultaneously (or alternatively), at points B and C, the agitation power can be increased.

Point P is the point at which admixtures are added to the cement/water mix (that is, the concrete is mixed) after which the concrete mix is allowed to harden. As seen in the figure, the total time $(t_2 + t_3)$ required by the concrete production method in accordance with the invention is longer than that of normal concrete $(t_1)$. By contrast, the method in accordance with the invention provides a remarkably shorter time for the economically critical process time, or the hardening time of concrete in the mold ($t_1$ and $t_3$, respectively), due to a higher growth rate of crystals ($a_1 > a$).

With respect to the repeatability of the retarder function, this invention allows liberties to be taken which cannot be otherwise tolerated. When the apparatus used for the implementation of the invention, on the basis of elevated mixing power demand or some other measurement, indicates that the formation of crystals has begun in the mix, seen as a measurable increase in stiffness, an additional amount of retarder can always be automatically admixed and/or the agitation increased so that the developed crystals will be broken.

Figure 3:
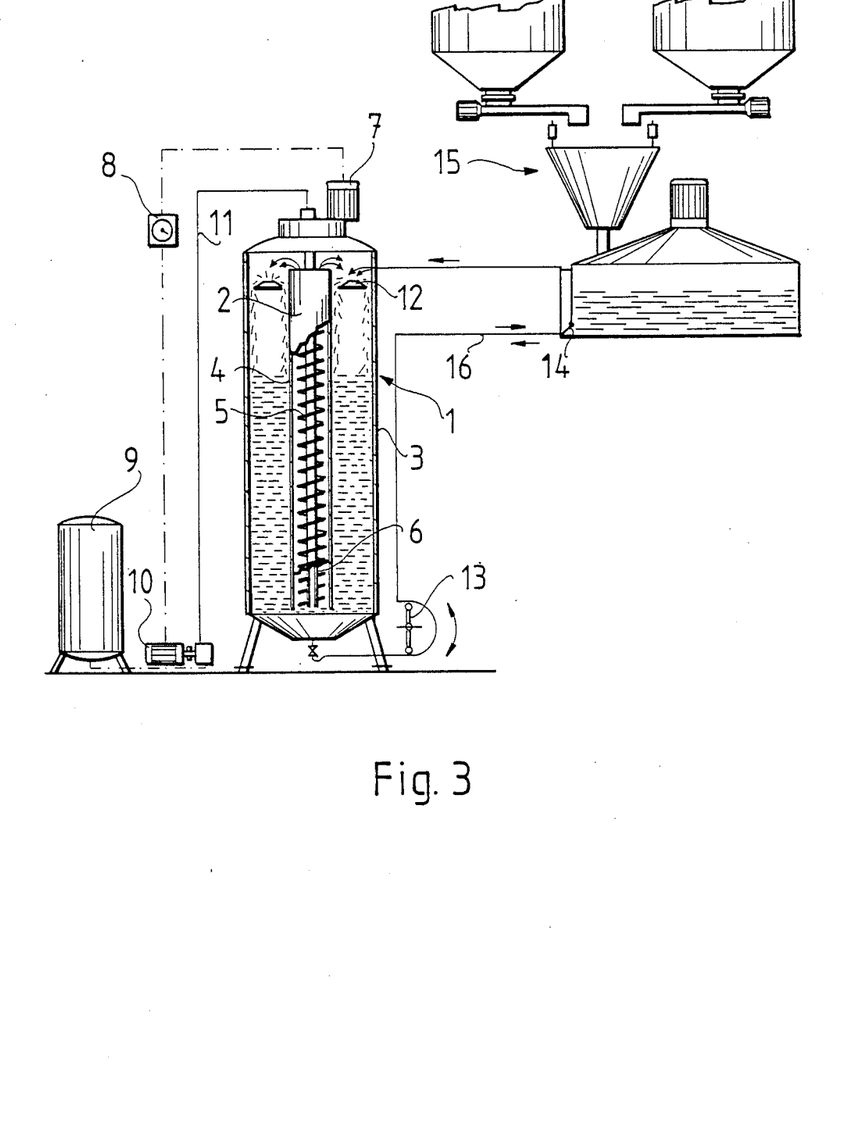
FIG. 3 is a schematic cross-sectional view of an embodiment of the apparatus according to the present invention.

FIG. 3 shows in a cross-sectional view the schematic construction of the apparatus used for implementing the method in accordance with the invention.

The apparatus comprises a relatively high mixing container 1 into which an oblong mixing part, for instance, a vertical auger mixer 2, is adapted for the implementation of the efficient mixing required in the method. The preferable shape of the container 1 is a cylinder, into which the mixer 2 is adapted coaxially. The bottom part of the container 1 tapers downwards, and its outer surface is surrounded by a heating sheath 3 with which the temperature of the paste in the container can be elevated. The auger mixer 2 comprises a cylindrical sheath 4 attached to the container wall from its upper end and, within the sheath, an auger 5 with a hollow shaft 6. The auger 5 is driven by a motor 7 to which a power meter 8 is connected. The retarder used in the method is stored in a separate container 9 from which it can be pumped with the help of a metering pump 10 via a pipeline 11 to the upper end of the hollow shaft 6 of the auger 5, and from there further to the lower part of the container. Divider baffles 12 are assembled at the upper end of the auger mixer. Furthermore, the apparatus comprises a circulation pump 13 for the cement paste, for instance, a peristaltic hose pump, and a three-way valve 14. FIG. 3 shows the apparatus in accordance with the invention connected to a conventional concrete production unit 15.

The apparatus operates as follows:

In the concrete production station 15, the binding agent, e.g., cement, is mixed together with the ash and water into a paste whose water/binding agent ratio corresponds to a concrete with ground-wet fluidity. With the help of the circulation pump 13, the cement/water paste is then taken from the concrete production station via the pipeline 16 to the mixing container 1, into which it enters from below. Then, the auger mixer 2 of the container is started in order to begin the mixing. As shown in the figure, the cement paste within the container is forced into a circulating movement, in which it flows upwards through the auger mixer 2 and gravitates down along the outer surface of the sheath of the auger mixer 2 and along the inner surface of the container. By guiding the cement paste, with the aid of divider baffles 12, to flow along the surfaces of the container, the paste is prevented from hardening onto the wall surfaces. The power demand of the auger mixer 2 is monitored by the power meter 8, and when an increase in paste stiffness is detected, retarder is admixed from the container 9 (refer to points B and C of FIG. 2) via the shaft 6 to the lower part of the mixing container 1. The container 1 is dimensioned by the design rule that, for instance, the entire batch of cement paste is circulated via the auger mixer 2, three times an hour.

FIG. 4 illustrates a preferable embodiment of the invention which utilizes an auger mixer 2, in which the pitch of the auger flight of the auger 5 is smaller in the upper part of the auger than in the pitch of the lower part. In the embodiment of the example, the diameter of the mixing auger was 250 mm, the pitch at the lower part of the auger about 200 mm, and in the upper part about 170 mm. Owing to this construction, the paste traversing through the auger mixer is subjected to a higher pressure as the paste is conveyed upwards. Simultaneously, strong shear forces are generated in the mixer. The pressure predisposes the hydration of cement because water is effectively pressed into the spongeous construction of binding agent particles, thus improving the initial contact of water to the binding agent. Due to the mixing, crystals formed in the paste are broken.

When desired, the paste temperature can be elevated with help of the heating sheath 3 of the mixing container of the mixing unit. As indicated by example 8, an increase in the temperature, for instance from 20° C. to 60° C., appreciably improves the hydration of the binding agent.

At the end of the predetermined hydration time, the cement paste, or part of it, is pumped with help of the circulation pump 11 via a three-way valve to the concrete production station 15, where the fillers, such as sand and stone aggregate, are admixed into it, after which the mixed concrete is cast into molds. If an amount of binding agent sufficient for several concrete batches has been produced in the mixing container 2, the remaining binding agent paste is brought into circulation by closing the branch of the three-way valve at the concrete production station side in the pipeline between the mixing container and the circulation pump.

EXAMPLE 1

Test cubes were produced from rapid hardening portland cement, clinker, lignosulfonate, and sand in accordance with prior art technology and by the method according to the invention. Table 1 presents the test results, which indicate the compression strengths of test cubes hardened by heat treatment (20° C.→70° C.) as a function of binding agent, clinker, and lignosulfonate contents as well as of the amounts of possibly formed gels.

The hydration time, or gel formation time, in the tests was 12 hours, corresponding approximately to an 8 to 10% degree of hydration.

During the tests presented in columns 6 and 7, pre-crystallization was carried out using ground clinker with a mesh of 550 m$^2$/kg, with the amount of clinker being 10% and 40% of the total amount of cement, respectively.

Due to the high amount of clinker, test 7 was carried out using a high water/cement ratio (10:1). When crystallization was complete after a mixing period of three hours, the crystals were allowed to settle, water was decanted, and the obtained material, at this stage with a water/cement ratio of 0.6, was mixed as such with a retarded, pre-gelled material, whose amount was 60% of the total amount of cement.

Test 8 was conducted by treating the material with carbon dioxide to obtain a porosity of 35% by volume.

Test 9 was conducted by replacing the portland cement as the binding agent with a mixture of portland cement and microsilica.

TABLE 1

| Test no. | 1 | 2 | 3 | 4 | 5 | 6 | 7 | 8 | 9 |
|---|---|---|---|---|---|---|---|---|---|
| Binding agent (kg/m$^3$) | 548 | 493 | 548 | — | — | — | — | — | — |
| Clinker (kg/m$^3$) | — | 55 | — | — | — | — | — | — | — |
| Binding agent gel (kg/m$^3$) | — | — | — | 548 | 493 | 493 | 328 | 548 | 493 |
| Clinker gel (kg/m$^3$) | — | — | — | — | 55 | — | — | — | — |
| Silica gel (kg/m$^3$) | — | — | — | — | — | — | — | — | 55 |
| Clinker crystals (kg/m$^3$) | — | — | — | — | — | 55 | 220 | — | — |
| Lignosulfonate (%) | — | — | 0.9 | 0.9 | 0.9 | 0.9 | 0.9 | 0.6 | 0.6 |
| Water/solids | 0.40 | 0.40 | 0.30 | 0.30 | 0.35 | 0.35 | 0.35 | 0.35 | 0.35 |
| Fluidity | g.w. | g.w | g.w | g.w | g.w | g.w | g.w | 5...10 | g.w |
| Temperature (°C.) | 21 | 20 | 20 | 21 | 21 | 20 | 20 | 30 | 20 |
| Compression strength (MN/m$^2$) | | | | | | | | | |
| 1 h 40° C. | 0 | 0 | 0 | 0 | 0 | 0 | 0 | 0 | 0 |
| 2 h 60° C. | 0 | 0 | 0 | 0 | 0 | 0 | 0 | | |
| 3 h 70° C. | 3.3 | 3.0 | 0 | 17.3 | 7.4 | 4.9 | 9.2 | 6.3 | 25.0 |
| 5 h 70° C. | 24.7 | 26.8 | 0 | 35.2 | 23.4 | 26.2 | 29.1 | 10.0 | 29.3 |
| 12 h 70° C. | 36.4 | 38.6 | 0 | 41.6 | 36.3 | 39.4 | 39.7 | | |

Concrete fluidity is indicated as either ground wet (g.w.) or in VB units.

The test presented in column 4 clearly indicates that the pre-gelled concrete is set at a vigorous pace in certain temperatures.

Tests presented in columns 6 and 7 indicate the effect of crystallization nuclei admixturing on the gelled mix. It can be noted that a higher amount of admixture accelerates the setting of the mix.

The tests described above also were performed using tartaric acid and sodium gluconate as retarders. The results of these tests are shown in Table 2 below.

TABLE 2

| | Test no. 1 | Test no. 2 |
|---|---|---|
| Binding agent gel (kg/m$^3$) | 548 | 548 |
| Tartaric acid (%) | 0.3 | — |
| Sodium gluconate (%) | — | 0.1 |
| Water/solids | 0.35 | 0.35 |
| Fluidity | g.w | g.w |
| Temperature (°C.) | 50 | 50 |
| Compression strength (MN/m$^2$) | | |
| 1 h 30° C. | 0 | 0 |
| 2 h 70° C. | 16.4 | 14.9 |
| 3 h 70° C. | 24.8 | 23.2 |

Concrete fluidity is indicated as ground wet (g.w.).

Test 2 was performed by also admixing 1% of hydrogen peroxide (using a solution of 30% by weight conc.) and 0.2% of antifoaming agent into the prehydrated binding agent. The degree of hydration was about 12 to 15%.

EXAMPLE 2

When slag is used as a binding agent, the retardation effect can be removed by admixing an activator of the binding agent. Applicable activators are different alkaline compounds, such as sodium hydroxide and sodium carbonate. Alternatively, a mixture of portland cement clinkers and some alkaline compound can be used.

In these tests, the hydration time was 12 hours. Although an accurate value for the degree of hydration of the slag could not be determined, it can be inferred from the mixing behaviour of the gel that the degree of hydration was about 8 to 10%.

Table 3 shows the development of compression strength for two slag-based mixes during heat treatment.

TABLE 3

| | Test no. 1 | Test no. 2 |
|---|---|---|
| Slag (kg/m$^3$) | 410 | — |
| Slag gel (kg/m$^3$) | — | 410 |
| Clinker (kg/m$^3$) | 72 | 72 |
| Sodium carbonate (%) | 3.5 | 3.5 |
| Lignosulfonate (%) | 1.3 | 1.3 |
| Water/solids | 0.42 | 0.42 |
| Fluidity | 5...10 | 5...10 |
| Temperature (°C.) | 20 | 21 |
| Compression strength (MN/m$^2$) | | |
| 1 h 40° C. | 0 | 2.0 |
| 2 h 60° C. | 2.0 | 12.5 |
| 3 h 70° C. | 15.8 | 23.3 |
| 5 h 70° C. | 24.6 | 30.0 |
| 12 h 70° C. | 31.0 | 34.2 |

The table shows that slag gelled in accordance with the invention is crystallized extremely quickly, achieving a compression strength of about 30 MN/m$^2$ within 5 hours.

EXAMPLE 3

The method in accordance with the invention has further been tested using different combinations of raw materials. Table 4 shows a compilation of compression strength values for test cubes manufactured using the following materials: RHPC, microsilica (Elkem), fly ash (PFA, Suomenoja), and slag (Ovako 450).

TABLE 4

| Test no. | 1 | 2 | 3 | 4 | 5 | 6 | 7 | 8 |
|---|---|---|---|---|---|---|---|---|
| Cement materials (kg/m$^3$) | | | | | | | | |
| RHPC | 550 | 350 | 500 | 300 | — | — | — | — |
| Silica | — | — | 50 | — | — | — | — | — |
| PFA | — | 200 | — | — | — | — | — | — |
| Slag | — | — | — | 200 | — | — | — | — |
| Gels (kg/m$^3$) | | | | | | | | |
| RHPC | — | — | — | — | — | 729 | — | — |
| RHPC + Silica | — | — | — | — | — | — | 729 | — |

TABLE 4-continued

| Test no. | 1 | 2 | 3 | 4 | 5 | 6 | 7 | 8 |
|---|---|---|---|---|---|---|---|---|
| RHPC + PFA | — | — | — | — | 728 | — | — | — |
| RHPC + Slag | — | — | — | — | — | — | — | 728 |
| Gel age (h) | — | — | — | — | 40 | 40 | 40 | 40 |
| Water/solids | 0.32 | 0.32 | 0.32 | 0.32 | 0.32 | 0.32 | 0.32 | 0.32 |
| Compression strength (MN/m$^2$) | | | | | | | | |
| 2.5 h 50° C. | 0 | 0 | 0 | 0 | 21.1 | 39.8 | 45.4 | 19.0 |
| 5.5 h 50° C. | 38.3 | 14.1 | 39.7 | 15.2 | 30.4 | 47.8 | 50.2 | 29.3 |
| 28 d 50° C. | 72.1 | 47.0 | 77.8 | | 59.4 | 79.0 | 84.2 | |

The test results indicate that the method in accordance with the invention achieves a better value of initial setting and a higher final strength than is achievable in the conventional method of production.

EXAMPLE 4

When the test apparatus constructed in accordance with this invention was used in testing retardation and its effect on the combined mechanical-chemical method, the result was better than with the purely chemical retardation.

The results are shown in Table 5 indicating the development of compression strength for different cement pastes over a period of 2 to 12 hours. The first column applies to a conventional rapid hardening cement-based paste, the second column represents a paste used in the previous tests with 0.5% lignosulfonate as retarder, and the third column values apply to a paste mixed continuously for the same time as the paste of column 2 was allowed to rest, i.e. 10 hours. The amount of retarder in the mechanically activated gel was the same as in the paste of test 2.

TABLE 5

| | Test no. | | |
|---|---|---|---|
| | 1 | 2 | 3 |
| RHPC/Lohja (kg/m$^3$) | 550 | — | — |
| RHPC gel (kg/m$^3$) (normally produced) | — | 550 | — |
| Clinker (kg/m$^3$) (mechanically activated) | — | — | 550 |
| Lignosulfonate (%) | — | 0.5 | 0.5 |
| Water/solids | 0.37 | 0.37 | 0.37 |
| Fluidity | g.w. | g.w. | g.w. |
| Temperature (°C.) | 20 | 20 | 20 |
| Compression strength (MN/m$^2$) | | | |
| 2 h 70° C. | 7.0 | 17.0 | 22.0 |
| 4 h 70° C. | 21.0 | 28.0 | 30.0 |
| 12 h 70° C. | 32.0 | 37.0 | 41.0 |

Concrete fluidity is indicated as ground wet (g.w.).

EXAMPLE 5

The effect of microsilica addition immediately before casting the concrete was also tested. By manufacturing test cubes in accordance with Example 1, the following compression strengths were achieved:

TABLE 6

| | Test no. | | | |
|---|---|---|---|---|
| | 1 | 2 | 3 | 4 |
| RHPC (kg/m$^3$) | 550 | 500 | — | — |
| Silica (kg/m$^3$) | — | 50 | 50 | — |
| Cement gel (kg/m$^3$) | — | — | 663 | — |
| Cement and silica gel (kg/m$^3$) | — | — | — | 729 |
| Water/solids | 0.32 | 0.35 | 0.35 | 0.35 |
| Fluidity | g.w. | g.w. | g.w. | g.w. |
| Temperature (°C.) | 20 | 20 | 20 | 20 |

TABLE 6-continued

| | Test no. | | | |
|---|---|---|---|---|
| | 1 | 2 | 3 | 4 |
| Compression strength (MN/m$^2$) | | | | |
| 2.5 h 50° C. | 0 | 0 | 53.1 | 45.4 |
| 5.5 h 50° C. | 38.3 | 39.7 | 57.4 | 50.2 |

Concrete fluidity is indicated as ground wet (g.w.).

Tests 1 and 2 are reference tests. Test 3 was performed by adding microsilica into the concrete mix, while in test 4, microsilica was mixed with cement and water before letting the cement enter the hydration reaction. In both cases the binding agent was allowed to hydrate under lignosulfonate retardation for 13.5 hour.

On the basis of the results, it is evident that the addition of microsilica during the casting of the concrete mix appreciably accelerates the progress of crystallization process. A noteworthy factor is the high initial strength of the mixes produced in accordance with the method.

EXAMPLE 6

The effect of microsilica addition on the hardening of concrete mix has also been tested on an industrial scale. The reference test was performed by producing conventional RHPC-based concrete using fly ash as the filler. Then, a 24-h RHPC-PFA gel was produced in accordance with the invention by adding 0.6% by weight of lignosulfonate. Furthermore, during the production of the concrete mix, 30 kg fly ash and 10 kg microsilica were added per cubic meter of concrete mix. The results are shown in Table 7.

TABLE 7

| | Test no. | |
|---|---|---|
| | 1 | 2 |
| RHPC (kg/m$^3$) | 300 | — |
| RHPC + PFA gel (kg/m$^3$) | — | 360 |
| PFA (kg/m$^3$) | 120 | 30 |
| Microsilica (kg/m$^3$) | — | 10 |
| Lignosulfonate (%) | — | 0.6 |
| Compression strength (MN/m$^2$) | | |
| 3 h/20° C. + 5 h/50° C. | — | 16.5 |
| 5 h/20° C. + 5 h/50° C. | 12.8 | — |
| 24 h/50° C. | 16.5 | 25.5 |

EXAMPLE 7

The effect of pressure on hydration was tested as follows:

Five batches of water/cement pastes were produced from rapid hardening portland cement, maintaining the batch temperatures at about 20° C. The cement paste of each batch was allowed to hydrate under the presence of lignosulfonate for 24 hours.

In the first test the water/cement paste was agitated in 15 min cycles at 2 hour intervals. In tests 2 to 5, a mechanical activation by agitation was performed first for 5 hours (cfr. with Example 4) and thereafter a further activation for 0, 5, 10, and 17 hours, respectively, by pressure in a closed container pressurized to 3 bar with compressed air.

The compression strengths of test cubes fabricated from the paste after the addition of sand are shown in Table 8.

TABLE 8

|  | Test no. | | | | |
|---|---|---|---|---|---|
|  | 1 | 2 | 3 | 4 | 5 |
| RHPC gel (kg/m$^3$) | 550 | 550 | 550 | 550 | 550 |
| Pressure activation (h) | — | — | 5 | 10 | 17 |
| Mechanical activation (h) | — | 5 | 5 | 5 | 5 |
| Water/solids | 0.37 | 0.37 | 0.37 | 0.37 | 0.37 |
| Fluidity | g.w. | g.w. | g.w. | g.w. | g.w. |
| Temperature (°C.) | 20 | 22 | 21 | 23 | 22 |
| Compression strength (MN/m$^2$) | | | | | |
| 1 h 70° C. | — | >1 | — | — | — |
| 2 h 70° C. | 15.5 | 19.6 | 20.9 | 12.9 | 19.2 |
| 3 h 70° C. | — | — | 26.2 | — | — |
| 4 h 70° C. | 29.1 | — | — | 32.2 | 29.7 |
| 5 h 70° C. | — | — | — | — | 36.8 |
| 12 h 70° C. | 37.3 | 39.1 | 40.5 | 42.5 | 47.5 |

Concrete fluidity is indicated as ground wet (g.w.).

The tests provide evidence that the pressure activation increases the compression strength of hardened mixes, which further indicates that pressure could improve the hydration process of the binding agent.

EXAMPLE 8

The effect of temperature on the progressing rate of hydration was investigated as follows:

Rapid hardening portland cement, lignosulfonate, and water were mixed into pastes, which were agitated in cycles of 15 min duration at 2 to 3 hour intervals while maintaining their temperature at 60° C. The gel lifetime, or the time lapse up to the stiffening of the gel due to the setting of the binding agent, was measured. The tests indicated that the gel lifetime was 6 h 15 min for an LSA amount of 0.3% by weight, 14 h 30 min for an LSA amount of 0.5% by weight, and 21 h for an LSA amount of 0.7% by weight, respectively.

Sand was added to the water/cement pastes of the binding agent, which were maintained in temperatures of 20° C. and 60° C., respectively, after which test cubes (size 4×4×16 cm$^3$) were fabricated and tested for compression strength as a function of time. The pastes used for the test cubes were all in the ground-wet fluidity. The amount of LSA used in the water/cement pastes was 0.5% by weight. The results are shown in Table 9.

The hydration time of the binding agent was 4 hours in test 4; 6 hours in tests 2 and 6; 10 hours in test 5; and 12 hours in test 7, respectively.

TABLE 9

|  | Test no. | | | | | | |
|---|---|---|---|---|---|---|---|
|  | 1 | 2 | 3 | 4 | 5 | 6 | 7 |
| Binding agent amount (kg/m$^3$) | | | | | | | |
| RHPC | 550 | — | 550 | — | — | — | — |
| RHPC gel (20° C.) | — | — | — | — | 550 | — | — |
| RHPC gel (60° C.) | — | 550 | — | 550 | — | 550 | 550 |
| Water/solids | 0.42 | 0.42 | 0.38 | 0.39 | 0.38 | 0.38 | 0.38 |
| Initial temp. (°C.) | 20 | 29 | 20 | 30 | 20 | 33 | 32 |
| Compression strength | (MN/m$^2$) | | | | | | |
| 2 h 60° C. | 0 | 15.5 | 3.8 | 17.2 | 11.8 | 22.6 | 29.4 |
| 3 h 70° C. | 21.6 | 25.8 | 20.1 | 24.8 | 21.3 | 28.8 | 32.9 |
| 4 h 70° C. | | | | | 27.0 | 31.7 | 36.3 |
| 5 h 70° C. | 32.5 | 32.8 | 35.1 | 31.9 | | | |
| 6 h 70° C. | | | | | 30.0 | 32.3 | 37.5 |
| 24 h 70° C. | 40.1 | 40.9 | 41.7 | 40.5 | 39.1 | 40.9 | 45.7 |

The test results indicate that the hydration process can be accelerated by increasing the temperature of the binding agent paste. In order to achieve an initial compressive strength of about 32 MN/m$^2$, a hydration period of about 10 to 12 h in a temperature of 60° C. and about 35 to 40 h in 20° C. is required.

In addition to the foregoing, retardation can be chemically stopped by adding chemicals during the setting phase which destroy the retardants. Chemicals of this kind are principally oxidants, such as various nitrates and peroxides (primarily hydrogen peroxide).

The prehydrated material can also be crystallized by a combination of two or several of the methods described above.

Hydrated material can furthermore be hardened using methods other than crystallization. Because in our method such gel is available in which lime is already released from the gel-forming particles, then, in accordance with this invention, it is extremely advantageous, quick, and simple to neutralize all lime at the same time by, for instance, using carbon dioxide or pozzolanic reactions. Here, calcium carbonate released from the reaction of lime and carbon dioxide provides the fast initial stiffening of the mix, while the crystallization of the binding agent is responsible for the final hardening of the cement mineral product.

In this manner, using carbon dioxide and/or, simultaneously, a fine meshed pozzolanic admixture, such as microsilica, concrete elements can be produced whose pH decreases below the critical limit value of pH 10 at a very early phase. This means that type E glass, ordinary glass, or other conventional magnesium silicate or silicate fibers can be used for reinforcing the cement matrix without decreasing the strength of reinforcement by high alkalinity as is the case with glass fibers in ordinary concrete.

This alternative allows a further increase in the said carbonation rate by, for instance, introducing ready-formed calcium carbonate crystal nuclei into the mix simultaneously with the treatment of the gelled mix with, e.g., carbon dioxide.

Equally, it may be noted that the aforementioned gel-like cement paste containing the binding agent, prior to the start of crystallization, has a flexible, rubber-like, easily workable and easily extrudible character, thus resulting in an extremely compacted material. Moreover, its workability under pressure even at a low water/cement ratio is reasonably good. Furthermore, when operating according to the method described above, it is extremely advantageous to use the said prehydrated cement paste in concreting operations in which high heat development is disadvantageous. This is the case, for example, when casting monolithic elements or when operating in countries with high ambient temperatures, or when an extremely compact, microcrack-free cement matrix is desired.

As described in references of the German literature of the art, the hydrated binding agent-based gel is able to retain water completely up to a temperature of 600° C. Consequently, the gelled, uncrystallized concrete, mortar or binding material produced in accordance with the invention can be dried by using a spray or mixing dryer or any other drying method if the 600° C. temperature limit is not significantly exceeded. The mixes that are obtained can later be crystallized simply by compression without any additional water, in effect resulting in super-compacted, fully mineral constructions.

What is claimed is:

1. A method for producing a hardened stone aggregate product which comprises the steps of:
   providing a hydraulically hardening binding agent which contains one or more retarding agents capable of retarding the crystallization of the binding agent,
   subjecting at least a portion of said binding agent to a hydration reaction with water for at least one hour to produce a paste of water and binding agent,
   agitating the paste of water and binding continuously or in one or several cycles during the hydration reaction,
   when the binding agent has reached a degree of hydration of from 10 to 90%, admixing with the paste a fine-ground pozzolanic material in an amount of 1 to 30% by weight of the binding agent in order to decrease the effect of the retarding agent to form an unhardened hydrated binding agent mixture, and
   hardening the hydrated mixture to form the stone aggregate product.

2. A method in accordance with claim 1, wherein the stiffness of the agitated paste of water and binding paste is monitored, and when an increase in the stiffness thereof is detected, additional binding agent containing one or more retarding agents is added to the paste.

3. A method in accordance with claim 1, wherein the agitation comprises a compacting with pressure the paste of water and binding agent in order to improve the hydration thereof.

4. A method in accordance with claim 1, wherein the retarding agent is selected from the group consisting of lignosulfonates, sugars and sugar acids, the retarding agent being present in an amount of 0.01 to 5.0% by weight of the binding agent.

5. A method in accordance with claim 1, further comprising admixing anions, capable of improving lime solubility, selected from the group consisting of formate, nitrate, and nitrite ions into the paste of water and binding agent.

6. A method in accordance with claim 1, wherein the paste of water and binding agent is agitated at an elevated temperature and elevated pressure.

7. A method in accordance with claim 1, wherein the paste of water and binding agent which has been subjected to hydration is added to a non-hydrated binding agent paste in an amount of 5 to 90% by weight to produce concrete or mortar.

8. A method in accordance with claim 1, wherein hardening of the hydrated binding agent mixture is conducted by heat treatment of the paste at a temperature of 20° to 85° C. for a period of 1 to 28 hours.

9. A method in accordance with claim 1, wherein the effect of the retarding agents is chemically stopped by admixing nitrates of hydrogen peroxide into the hydrated binding agent mixture.

10. A method in accordance with claim 1, wherein the binding agent is a slag-based binding agent, and the hydrated binding agent mixture is hardened by adding an activator of the binding agent which is portland cement clinker or sodium carbonate.

11. An apparatus for hydrating a rapidly hardening binding agent to be used in the production of a mineral product which comprises:
   an oblong, at least approximately vertically mounted mixing container;
   means for feeding a paste of water and binding agent into and from the mixing container;
   mixing means fitted within the mixing container at least approximately parallel to its vertical axis, said mixing means comprising a cylindrical sheath open at its lower end, and a mixing auger having a shaft fitted within the sheath for agitating the paste of water and binding agent that is fed into the container and for lifting it from the lower part of the container to the upper part thereof, and
   drive means attached to the mixing means for rotating the mixing auger, wherein the shaft of the mixing auger is hollow and open-ended and includes means attached to the upper end thereof for feeding retarding agent into the container, whereby the retarding agent can be admixed via the shaft of the auger into the lower part of the mixing container.

12. An apparatus in accordance with claim 11, wherein the pitch of the mixing auger is smaller at the upper end than at the lower end thereof, so that, while traversing the mixing auger, the higher the paste is conveyed, the higher the pressure it is subjected to.

13. An apparatus in accordance with claim 11 or 12, wherein a power meter is connected to the mixing auger in order to indicate the power demand required by the rotation of the auger.

14. An apparatus in accordance with claim 11, wherein a heating sheath is fitted around the mixing container in order to provide an adjustable temperature for the paste of water and binding agent being mixed in the mixing container.

15. An apparatus in accordance with claim 11, wherein divider baffles are fitted about the upper end of the mixing auger in order to direct the flow of the paste of water and binding agent to take place along the walls of the mixing container and the mixing means, respectively.

16. The method in accordance with claim 1, wherein filler materials are added to the paste of water and binding agent during hydration of the binding agent.

17. The method in accordance with claim 4, wherein the retarding agent is present in an amount of 0.1 to 3.0% by weight of the binding agent.

18. The method in accordance with claim 4, wherein the retarding agent is a lignosulfonate which is present in an amount of 0.5 to 2.5% by weight of the binding agent.

19. The method in accordance with claim 8, wherein the heat treatment temperature is 40° to 70° C. and the period of heat treatment is 3 to 12 hours.

20. The method in accordance with claim 1, wherein the paste of water and binding agent is agitated in a plurality of cycles which include mixing periods of 10 to 15 minutes at 2 to 4 hour intervals.

21. The method in accordance with claim 6, wherein the elevation in temperature is from 20° C. to 60° C.

22. The method in accordance with claim 16, wherein the filler materials are selected from the group consisting of gravel, sand, wood, grass, hays and mixtures thereof.

23. The method in accordance with claim 1, wherein the hydraulically hardening binding agent is portland cement, iron furnace slag or blast furnace slag.

24. The method in accordance with claim 1, wherein the fine-ground pozzolanic material is microsilica or fly ash.

* * * * *